UNITED STATES PATENT OFFICE.

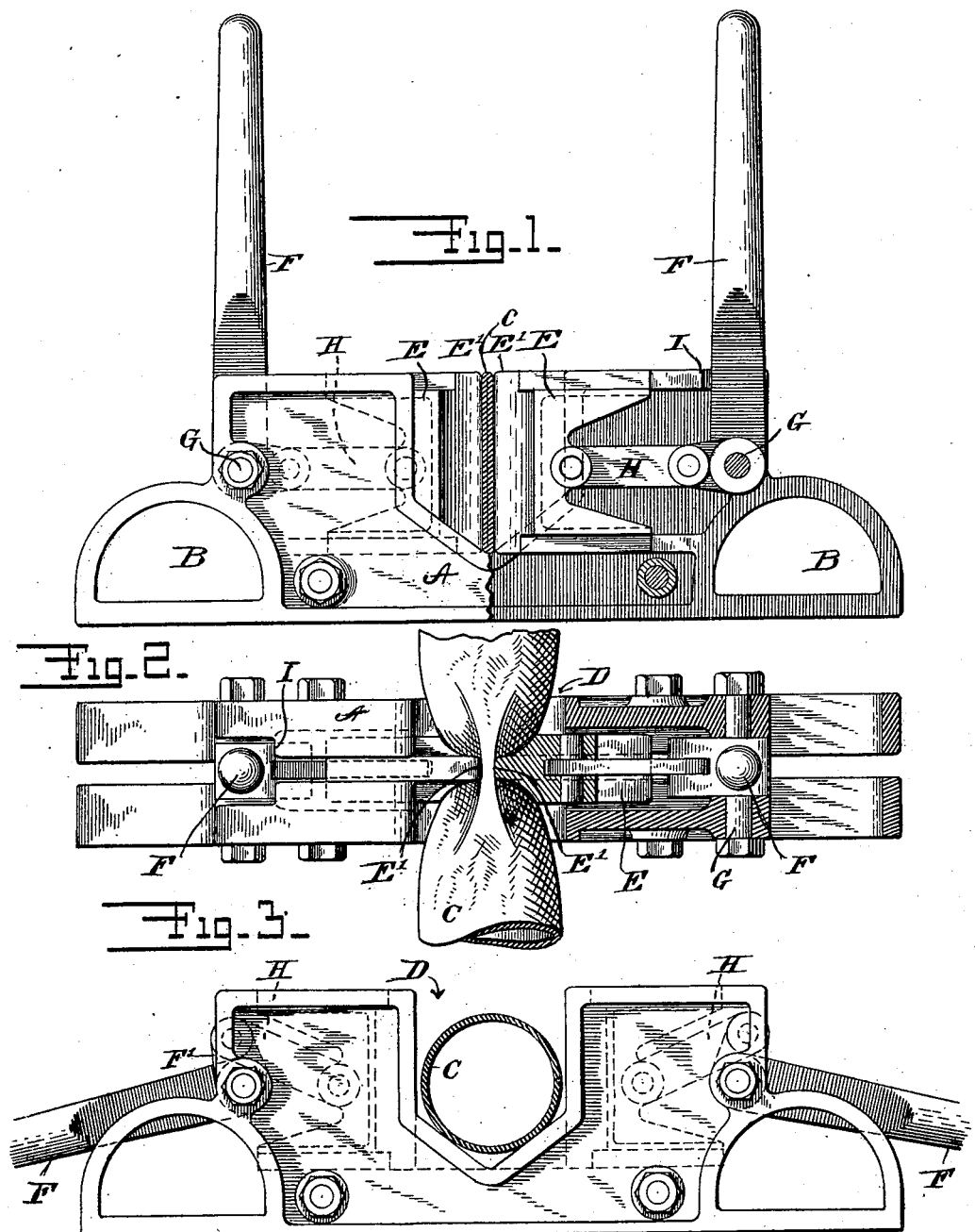

JAMES HENRY TOWERS, OF NEW BRITAIN, CONNECTICUT, ASSIGNOR TO P. & F. CORBIN, OF NEW BRITAIN, CONNECTICUT, A CORPORATION OF CONNECTICUT.

FIRE-HOSE SHUT-OFF.

SPECIFICATION forming part of Letters Patent No. 698,874, dated April 29, 1902.

Application filed January 7, 1902. Serial No. 88,716. (No model.)

*To all whom it may concern:*

Be it known that I, JAMES HENRY TOWERS, a citizen of the United States, residing at New Britain, county of Hartford, State of Connecticut, have invented certain new and useful Improvements in Fire-Hose Shut-Offs, of which the following is a full, clear, and exact description.

My invention relates to mechanical shut-off devices for hose.

The invention is chiefly useful in connection with large-sized hose, such as fire-hose, and may be applied whenever it is desired to close the passage of water through said hose or any section thereof. As is well known, fire-engines and hydrants are frequently provided with a plurality of hose connections, to which a corresponding number of lines of hose may be attached. Ordinarily each line of hose is composed of several sections coupled together in the usual way. If one of these sections should break, it would be necessary to either stop the engine or close the hydrant for the time required to repair the hose or insert a new section, which shutting down of the engine or hydrant would, in effect, put out of commission the other lines of hose attached thereto.

The object of this invention is to provide a simple mechanical contrivance by which any one of the different lines of hose may be closed to permit the taking out of a section that may be broken without shutting off the flow of water through any other particular line of hose.

The preferred embodiment of my invention is shown in the accompanying drawings, in which—

Figure 1 is a side elevation, partly in section. Fig. 2 is a plan view, also partly in section. Fig. 3 is a side elevation, the parts being shown in a different position from that shown in Fig. 1.

A is a frame or suitable standard, preferably composed of two sections secured together in any desired way, but spaced apart in order to form guideways or tracks for movable jaws, hereinafter referred to. B B are holes at opposite ends of said frame-pieces A A, in which the operator may insert his feet during the act of operating the devices, as hereinafter described.

D is an opening or transverse passage in the upper part of the frame-sections A of a size suitable to loosely receive a hose-pipe C when the same is distended to its usual operative size.

E E are sliding blocks mounted in the aforesaid guideways between the frame-sections A in such manner that they may be moved back and forth. Each block E is provided with a jaw E', suitably shaped to engage a hose-pipe E and compress the sides until the passage-way therethrough is closed, as shown in Fig. 1. The means for operating said blocks may be formed in a variety of ways, but preferably of a construction such as shown in the drawings, in which F F are operating-handles pivoted at G G. These handles F have offset extensions or crank-arms F'. Between each crank F and each block E is a link H. This construction produces, in effect, a toggle-joint, so that when the operating-handles F are moved from the position shown in Fig. 3 to the position shown in Fig. 1 the blocks E E are moved toward each other to the position shown in Fig. 1. The reverse movement of the handles imparts a reverse movement to the blocks E.

In the preferred construction the arrangement is such that when the handles stand in the position shown in Fig. 1 the jaws E' E' stand apart a distance substantially equal to the thickness of the hose C when compressed or closed. By this arrangement danger of cutting the hose is avoided.

I I are shoulders on the inside of the frame-sections A, which serve to check the upward and inward throw of the handles F F. In the particular construction shown the lower part of the passage D, in which the hose rests, is V-shaped or is depressed in the central portion, the purpose being to allow sufficient room for the lower edge of the hose when it is compressed and displaced. Were it not for this or an equivalent provision the sides of the hose might slip on the jaws E' during the closing process, which slipping might produce undue wear.

In operation if a break is detected in a line of hose a shut-off device may be applied to one of the sections between the broken section and the engine or hydrant or other source of supply. When the device is applied, the broken section may be removed and a new one replaced, whereupon the shut-off device may be removed. By this means it is not necessary to temporarily put out of commission any other line of hose that may be attached to a common source of supply.

The guideways between the frame-sections A A not only prevent the vertical displacement of the jaws, but also the lateral displacement thereof. Consequently the hose cannot roll between the jaws nor can the jaws slip upon the hose during the application of the apparatus nor while it is performing its intended function.

It should be understood that I regard the screw or cam motion as the equivalent of the link motion shown in the drawings as the means for transmitting movement to the blocks E E. It should also be understood that the shape of the handles F is immaterial and that the same might be modified in a variety of ways without departing from the spirit of my invention.

What I claim is—

1. In a device of the character described, a frame, guides thereon, a pair of jaws each carried thereby and on said guides, a transverse passage in said frame forming a space between said jaws to readily receive a hose-pipe, and means to operate said jaws to move them toward or away from each other.

2. In an apparatus of the character described, a frame composed of a pair of sections, guideways between said sections, blocks movable in said guideways, a transverse passage through said frame-sections and between the facing edges of said blocks, whereby the hose may be readily placed between the blocks, and means to move the blocks toward or away from each other, substantially as and for the purpose specified.

3. In a device of the character described, a frame, reciprocating blocks carried thereby, means to prevent the lateral or vertical displacement of said blocks, operating-handles pivotally attached to the frame, and means of connection between said handles and said blocks whereby the movement of the frame is transmitted to the latter, and a passage-way for hose or the like through said frame between the detached or facing edges of said blocks.

4. In an apparatus of the character described, a frame composed of a plurality of sections, guideways therein to receive reciprocating blocks the facing edges of said blocks being provided with jaws, a passage-way through said frame and between the facing edges of said blocks, operating devices comprising handles pivoted to the frame, cranks carried by said handles adjacent the pivotal connection, and links between said blocks and said cranks, substantially as and for the purpose described.

Signed at New Britain, Connecticut, this 4th day of January, 1902.

JAMES HENRY TOWERS.

Witnesses:
G. ERNEST ROOT,
C. H. BLAIR.